No. 709,479. Patented Sept. 23, 1902.
C. GLOVER.
COASTER BRAKE.
(Application filed June 11, 1901.)
(No Model.) 2 Sheets—Sheet 1.

WITNESSES:
Frank S. Ober
Rob S. Allyn

INVENTOR
Charles Glover
BY
ATTORNEY

No. 709,479. Patented Sept. 23, 1902.
C. GLOVER.
COASTER BRAKE.
(Application filed June 11, 1901.)
(No Model.) 2 Sheets—Sheet 2.
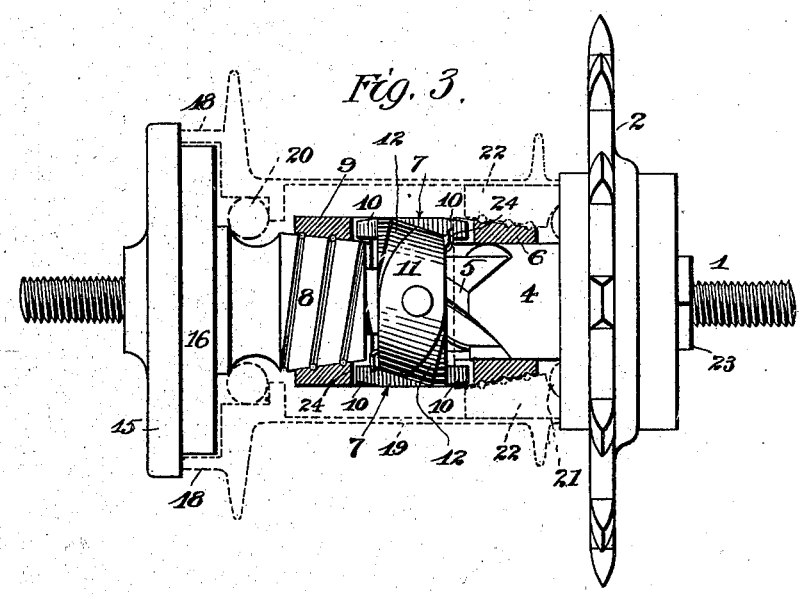
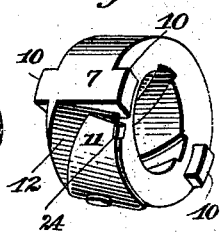
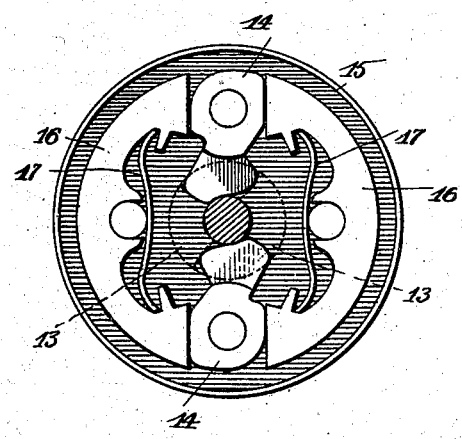
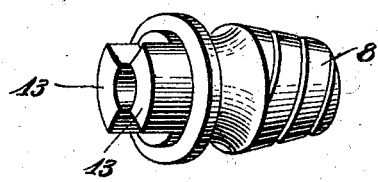
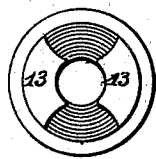
WITNESSES:
Frank S. Ober
Rob S. Allyn
INVENTOR
Charles Glover
BY
R. C. Mitchell
ATTORNEY

UNITED STATES PATENT OFFICE.

CHARLES GLOVER, OF NEW BRITAIN, CONNECTICUT, ASSIGNOR TO P. & F. CORBIN, A CORPORATION OF CONNECTICUT.

COASTER-BRAKE.

SPECIFICATION forming part of Letters Patent No. 709,479, dated September 23, 1902.

Application filed June 11, 1901. Serial No. 64,096. (No model.)

*To all whom it may concern:*

Be it known that I, CHARLES GLOVER, a citizen of the United States, residing at New Britain, Hartford county, Connecticut, have invented certain new and useful Improvements in Coaster-Brakes, of which the following is a full, clear, and exact description.

My invention relates to power-transmitting and brake mechanism, and I shall describe it particularly as applied to that class of devices termed "coaster-brakes" for cycles and other vehicles.

The function of a coaster-brake as used upon bicycles and other vehicles is to permit the rider to cease pedaling whenever he so desires, allowing the machine to coast along freely under its own momentum. The construction is such that the user may at any time by simply reversing the direction of the pedal-crank throw in suitable brake mechanism which coacts with the hub of the driving-wheel in such manner that the advance of the machine may be slowed down to the desired speed or may be entirely checked.

The following are the more conspicuous advantages which I seek to obtain: simplicity, durability, effectiveness, compactness, and strength of construction, certainty of action, and ease in adjusting, assembling, or dismembering. All of these advantages I secure by the employment of the mechanism hereinafter described, and shown (in its preferred form) in the accompanying drawings, in which—

Figure 1:
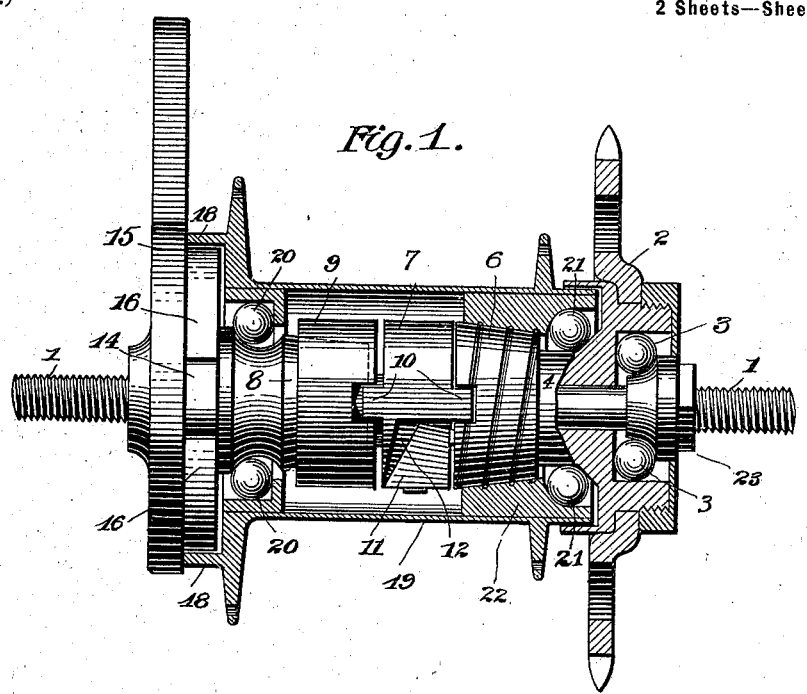
Figure 2:
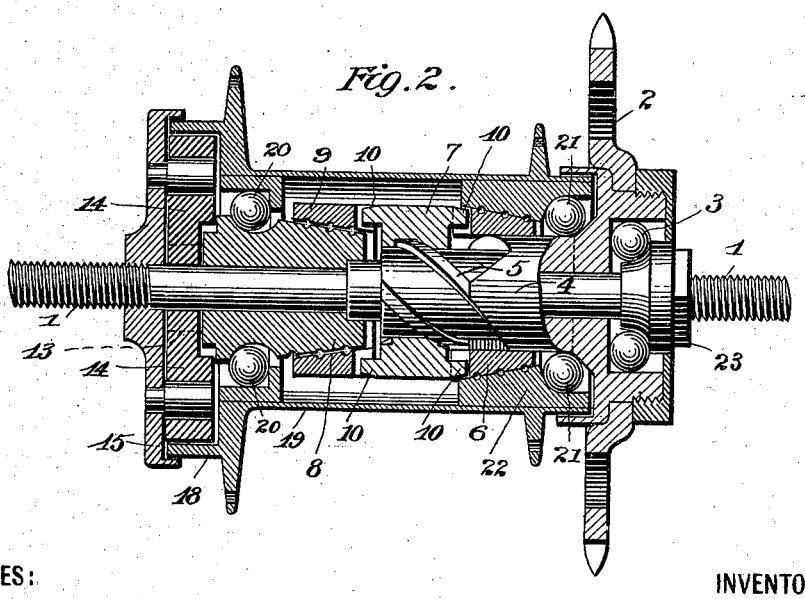

Figure 1 is a plan view, partly in section. Fig. 2 is in the main a vertical section. Fig. 3 is a view partly in elevation and partly in vertical section, the position of the parts being shifted from that shown in the previous figures. Fig. 4 is a perspective view of a detail. Fig. 5 is a vertical projection of the brake proper. Fig. 6 is a perspective view of a detail, and Fig. 7 is an end elevation of the detail shown in Fig. 6.

The following detailed description relates particularly to the preferred form of my invention, which, it is obvious, is susceptible of a variety of modifications without departing from the spirit or scope of my invention.

1 is a main shaft or axle.

2 is a gear or sprocket wheel, which will be termed herein the "driver." The driver 2 is mounted in such manner that it may rotate freely upon the axle 1—for example, by means of suitable antifriction-bearings 3.

4 is a hub projecting from the driver 2.

5 is a worm on the inner end of the hub 4.

6 is a ring having a tapered exterior surface. The ring 6 is loosely fitted upon the hub 4 and capable of being longitudinally shifted thereon.

7 is a sleeve mounted upon the worm 5.

8 is a cone loosely mounted upon the axle 1, and 9 is a ring having its interior surface shaped to frictionally engage the cone 8 when said ring is forced up the incline of said cone. The sleeve 7 is provided with projections 10 10, which take into suitable recesses in the rings 6 9, so that said parts (the sleeve 7 and the rings 6 9) cannot turn independently of one another around their common center.

11 is a lever, preferably of spring form, said lever being carried by the sleeve 7. A nose 24 projects from each end of said lever. The normal tendency of the lever 11 is to move the noses beyond the end faces of said sleeve. The inside surface of each end of said lever 11 when in the form of a spring bears upon an incline 12 on the side of the sleeve 7, whereby when the noses 24 of the lever are pushed back the ends of the spring will ride up the inclines, thereby tending to straighten the spring out and put it under stress, so that as soon as the spring is released it will tend to resume the position shown in Fig. 3.

13 13 are projections from the end of the cone 8, by which the brake-actuator cams are moved.

14 14 are brake-actuating cams pivotally mounted upon a suitable stationary bracket 15, and 16 16 are brake-shoes carried by said bracket.

17 17 are springs by which the brake-shoes may be retracted or held out of operative engagement with the moving part which said shoes are designed to check.

The brake mechanism in its preferred form is shown in detail, Fig. 5, but will be made the subject of another application, Serial No. 64,097, and therefore will be described only briefly herein.

The cams 14 14 are double acting in that they stand between the ends of the brake-shoes 16 16, so that when tilted the brake-shoes will be moved diametrically outward and away from each other, so as to frictionally engage with the inner surface of a flange 18, carried by the hub 19 of the wheel to be driven.

20 21 are suitable bearings for the hub 19.

22 is a socket fixed within the hub 19, the inner surface of which is adapted to receive and be engaged by the tapered ring 6.

The operation of the device is as follows: The mechanism is secured in suitable position upon one of the wheels of a vehicle to be driven, 19 representing the hub of said wheel. Power is applied through the driver 2, which in turn rotates the driver-hub 4, bearing the worm 5. When the driver 2 is advanced, the worm 5 tends to shift the sleeve 7 to the right, whereupon the nose 24 of the lever 11 engages with and moves the ring 6 into slight engagement with the socket 22 of the hub 19. The continued forward movement of the driver moves the sleeve 16 farther to the right, pressing the ring 6 more tightly into engagement with the socket 22, the spring-lever 11 meanwhile being pushed back, so as to ride up the incline 12. The ring 6 becomes so tightly engaged with the clutch 22 that the forward movement of the driver is imparted to the hub. In Figs. 1 and 2 of the drawings the parts are in the position which permits the power of the driver 2 to be imparted to the hub 19 of the driving-wheel. In this position each nose 24 is so far retracted from the end surface of the sleeve 11 that the clutch-ring 9 is permitted to free itself entirely from the brake-actuator 8. When the rider desires to rest, he may cease pedaling, whereupon the driver 2 slows down or stops. The instant the speed of the hub 19 is in excess of the driver 2 it being clutched by the ring 6 will rotate said ring 6 slightly in excess of the speed of rotation of the hub of the driver. This slight excess rotative speed of the ring 6 will be imparted to the ring 7, which because of the pitch of the worm 5 will be caused to move to the left. In moving to the left the spring-lever carrying the noses 24 rides down the incline 12. The nose 24, projecting toward the clutch-ring 9, engages said ring and pushes it toward and into engagement with the brake-actuator 8. As soon as the sleeve 7 is approximately halfway between the ring 6 and the ring 9 the further movement of the sleeve 7 to the left will cause the spring-lever 11 to be again put under stress, retracting the nose 24 from engagement with the ring 6, allowing the latter to become freed from the socket 22, and disengaging the driver from the hub 19. In the meantime the clutch-ring 9 has seized firm hold upon the brake-actuator 8, coupling together said brake-actuator and the driver through the medium of the sleeve 7. The parts are then in the position indicated in Fig. 3. To apply the brake, the driver 2 is rotated in the reverse direction, whereupon the brake-actuator is rotated, so that the projections 13 will engage with the arms of the cam 14, throwing said cams in such manner as to cause the brake-shoes 16 to frictionally engage with the flange 18 of the wheel-hub 19. The degree of frictional resistance between the brake-shoes 16 and the flange 18 may be varied at will, so that the driving-wheel may be slowed down to any desired speed or entirely checked.

To release the brake, the driver 2 is advanced, shifting the sleeve 7 to the right and freeing it from the ring 9, which in turn becomes disengaged from the brake-actuator 8. The spring-lever 11 on the sleeve 7 aids in connecting either the ring 9 or the ring 6 with the cone 8 or socket 22, respectively, and it also serves to properly position said parts, so that the shifting of the sleeve 7 will instantly start either one of said rings 6 or 9 toward the part which it is designed to clutch, thereby avoiding lost motion. The shifting device comprises the three parts 6, 7, and 9, and in operation they are longitudinally expansible or collapsible, the function of the spring-lever 11 being to cause said parts to normally move away from each other or expand longitudinally. It is this capacity that permits the quick shifting of the engagement of the driver with either the hub or the brake-actuator, a feature of great importance, since it prevents unnecessary lost motion and makes the action sure and positive.

There are several advantages due to the dividing of the clutch member into three parts. For example, one advantage is that when the parts are in the position shown in Fig. 1, and it is decided to shift the sleeve 7, so as to throw the clutch member 9 into engagement with the brake-actuator, the shifting of said sleeve 7 may be instantly and easily accomplished, since the wedging effect or jam of the cone 6 with the part 22 does not first have to be overcome, the parts 7 and 6 having no permanent endwise engagement. As soon as the member 7 leaves the member 6 the latter frees itself from the member 22, and the clutch-ring 9 is simultaneously engaged with the brake-actuator 8. Even if at this moment the part 6 is still in engagement with the part 22 the action of the mechanism is quick and reliable, since said part 6 will be freed solely by the action of the rotation of the hub 19. Another advantage of this construction is that the spring 11, carried by the intermediate member 7 of the divided clutch member, serves to throw either end piece 6 or 9 into correct position for the final thrust or set given by the sleeve 7. These and other advantages contribute to the effective operation of the mechanism.

The drawings should be considered as illustrative rather than definitive, since it is obvious that many modifications are possible without departing from the scope of the invention.

It should be understood that I do not desire to limit my invention to any particular field of usefulness.

What I claim is—

1. In a device of the character described in combination, an axle, a wheel-hub, a driver, a worm carried thereby, internally-threaded sleeve mounted on said worm and coacting therewith, a brake and a brake-actuator, clutch devices separate from the sleeve and between said sleeve and said hub and between said sleeve and said brake-actuating means for independently connecting or disconnecting the driver with said hub or with said brake-actuating means.

2. In a power-transmitting and brake mechanism for cycles and the like in combination, a wheel-hub, a brake mechanism therefor, a driver, a clutch between said driver and said brake mechanism and a separate clutch between said driver and said hub and an internally-threaded sleeve separate from each of said clutches and located between the same and mounted on said driver, and means to impart both rotary and longitudinal movement to said sleeve to independently throw and detachably hold either of said clutches in operative engagement with the hub or the brake-actuator.

3. In a coaster-brake for cycles and the like in combination, an axle, a driving-wheel, a hub therefor, a brake, brake-actuating means, a driver, an extension from said driver, a worm thereon, an internally-threaded sleeve mounted on said extension, a clutch loosely mounted on said extension, a socket carried by the hub and adapted to receive said clutch, a second clutch on the opposite side of said sleeve coacting with said brake-actuating means, said sleeve and clutches having independent longitudinal movement, means for locking said parts against independent rotary movement, and a spring-lever carried by one of said parts and bearing against the other.

4. In a device of the character described in combination, a shifting device comprising three members arranged end to end said members being independent of one another for limiting the longitudinal movement, and means to couple the same against independent rotative movement, and a spring-lever mounted upon the intermediate member and bearing against the other members, and independent clutch devices coacting with the end members of said shifting device, a driving-wheel connected with one of said independent clutch devices, and a brake coacting with the other of said independent clutch devices.

5. In a device of the character described in combination, a wheel-hub, a brake mechanism therefor, a driver, means coacting with the driver and controlled by the direction of rotation of the same to engage either said wheel-hub or said brake mechanism, said means comprising a shifting device formed of three members arranged end to end, and a lever carried by the intermediate member, and means to normally project the ends of said lever beyond the end faces of said intermediate members.

Signed at New Britain, Connecticut, this 5th day of June, 1901.

CHARLES GLOVER.

Witnesses:
C. W. GRISWOLD,
G. E. CHRIST.